United States Patent [19]

Kishita et al.

[11] Patent Number: 5,420,189
[45] Date of Patent: May 30, 1995

[54] ORGANOPOLYSILOXANE COMPOSITIONS

[75] Inventors: Hirofumi Kishita, Annaka; Kouichi Yamaguchi, Takasaki; Takashi Matsuda, Annaka; Kenichi Fukuda, Takasaki; Nobuyuki Kobayashi, Annaka; Shinichi Sato, Annaka; Hitoshi Kinami, Annaka, all of Japan

[73] Assignee: Shin-Etsu Chemical Company, Limited, Tokyo, Japan

[21] Appl. No.: 205,115

[22] Filed: Mar. 3, 1994

[30] Foreign Application Priority Data

Mar. 19, 1993 [JP] Japan .................. 5-085733

[51] Int. Cl.$^6$ .............................. C08G 77/08
[52] U.S. Cl. .......................... 524/731; 528/15
[58] Field of Search ................. 524/731; 528/15

[56] References Cited

U.S. PATENT DOCUMENTS 4,355,149  10/1982  Koda et al. .
5,064,889  11/1991  Ikeno ..................... 524/731
5,064,891  11/1991  Fujiki et al. ............. 524/731
5,120,810   6/1992  Fujiki et al. ............. 524/731

FOREIGN PATENT DOCUMENTS 0393984  10/1990  European Pat. Off. .

Primary Examiner—Melvyn I. Marquis
Attorney, Agent, or Firm—Birch, Stewart, Kolasch & Birch

[57] ABSTRACT

An organopolysiloxane composition comprising (A) a linear, alkenyl-containing, fluorinated organopolysiloxane, (B) a cyclic fluorinated organosiloxane as a tackifier, (C) an organohydrogenpolysiloxane having at least two hydrogen atoms attached to a silicon atom in a molecule, and (D) a platinum group metal catalyst has excellent properties inherent to fluorinated silicone rubber, and cures into products having adhesion and close contact to various materials including metals, glass and resins.

24 Claims, 1 Drawing Sheet

U.S. Patent
May 30, 1995
5,420,189
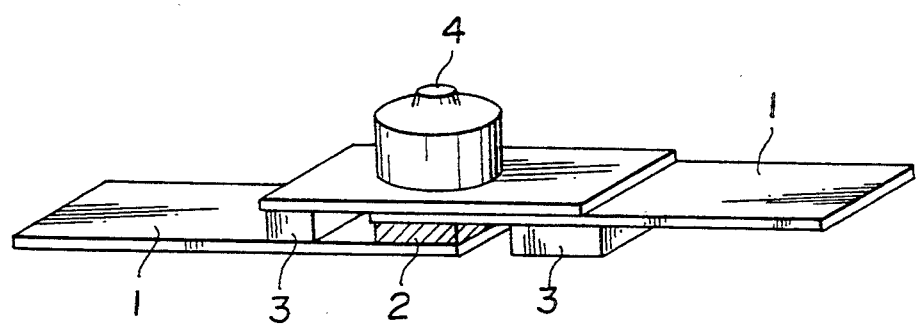

ORGANOPOLYSILOXANE COMPOSITIONS

BACKGROUND OF THE INVENTION

FIELD OF THE INVENTION

This invention relates to an organopolysiloxane composition and more particularly, to a fluorinated organopolysiloxane composition having excellent properties inherent to fluorinated silicone rubber, curing into products having adhesion and close contact to various materials, and suitable as packing, sealing and coating materials in electric and electronic fields.

In addition to electric insulation, heat resistance, low-temperature resistance and weatherability inherent to silicone rubber, fluorinated silicone rubber has improved surface properties including solvent resistance, water repellency, oil repellency and releasability, but suffers from poor adhesion to various support materials. There is a desire to have fluorinated silicone rubber having acceptable adhesion as well as surface properties.

SUMMARY OF THE INVENTION

Therefore, an object of the present invention is to provide an organopolysiloxane composition having excellent properties inherent to fluorinated silicone rubber and curing into products having adhesion and close contact to various materials.

According to the present invention, there is provided an organopolysiloxane composition comprising (A) a linear fluorinated organopolysiloxane having in a molecule at least two monovalent hydrocarbon groups each having an aliphatic unsaturated bond attached to a silicon atom, and further having at least one group selected from monovalent perfluoroalkyl and monovalent perfluoropolyether groups attached to a silicon atom, (B) a cyclic fluorinated organosiloxane of the general formula (1):

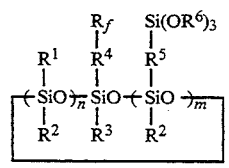

wherein $R^1$ is a substituted or unsubstituted monovalent hydrocarbon group having an aliphatic unsaturated bond, $R^2$, $R^3$ and $R^6$ are independently selected from substituted or unsubstituted monovalent hydrocarbon groups free of an aliphatic unsaturated bond, $R^4$ and $R^5$ are independently selected from substituted or unsubstituted divalent hydrocarbon groups free of an aliphatic unsaturated bond, Rf is a monovalent perfluoropolyether group or monovalent perfluoroalkyl group, and letters m and n are numbers satisfying $n+m=3$, $n\geq 1$, and $m\geq 1$, (C) an organohydrogenpolysiloxane having at least two hydrogen atoms attached to a silicon atom in a molecule, and (D) a platinum group metal catalyst.

The composition is obtained by blending components (A) to (D) together, preferably by controlling the amount of the organohydrogenpolysiloxane such that there is 0.5 to 5 mol of SiH group per mol of the aliphatic unsaturated group in the entire composition. The resulting composition has excellent properties inherent to fluorinated silicone rubber and cures into a product having adhesion and close contact to various materials such as glass, aluminum, iron and epoxy resins because component (B) is an effective tackifier. The cured product is also fully resistant against solvent swelling.

BRIEF DESCRIPTION OF THE DRAWING

The only FIGURE is a perspective view of an assembly for a shearing adhesion test.

DETAILED DESCRIPTION OF THE INVENTION

Component (A) of the organopolysiloxane composition according to the present invention is a linear fluorinated organopolysiloxane having in a molecule at least two monovalent hydrocarbon groups each having an aliphatic unsaturated bond attached to a silicon atom. It further has at least one group selected from monovalent perfluoroalkyl and monovalent perfluoropolyether groups attached to a silicon atom.

Preferred examples of the linear, alkenyl group-containing, fluorinated organopolysiloxane include polymers of the following general formula (7).

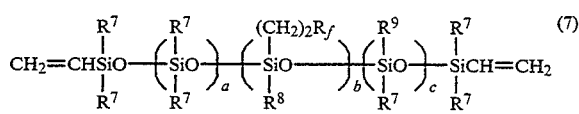

These polymers are obtained by copolymerizing a cyclotrisiloxane of formula (2), a cyclotrisiloxane of formula (3) and/or a cyclotrisiloxane of formula (4) with a compound of formula (5) in the presence of an acid or alkali catalyst. Alternatively, the polymers are obtained by polymerizing a cyclotrisiloxane of formula (2), a cyclotrisiloxane of formula (3) and/or a cyclotrisiloxane of formula (4) in the presence of a silanolate catalyst of formula (6).

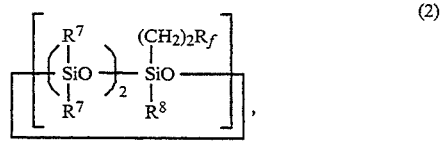

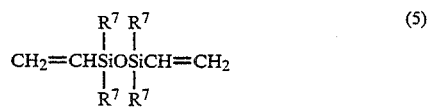

-continued

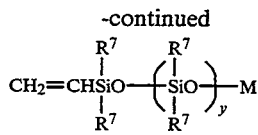
(6)

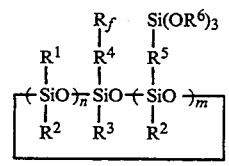
(1)

In formulae (2) to (7), $R^7$ and $R^8$ are independently selected from substituted or unsubstituted monovalent hydrocarbon groups having 1 to 12 carbon atoms free of an aliphatic unsaturated bond, $R^9$ is a monovalent hydrocarbon group having 2 to 12 carbon atoms and having an aliphatic unsaturated bond, and Rf is a monovalent perfluoropolyether group or monovalent perfluoroalkyl group having 1 to 18, especially 1 to 12 carbon atoms.

Examples of the hydrocarbon group represented by $R^7$ and $R^8$ include alkyl groups such as methyl, ethyl, isopropyl and butyl, cycloalkyl groups such as cyclohexyl and cyclopentyl, aryl groups such as phenyl, tolyl and xylyl, aralkyl groups such as benzyl and phenylethyl, halogenated hydrocarbon groups such as chloromethyl, chloropropyl, chlorocyclohexyl and 3,3,3-trifluoropropyl, and cyano hydrocarbon groups such as 2-cyanoethyl. Examples of the hydrocarbon group represented by $R^9$ include vinyl, allyl and ethynyl groups.

Examples of Rf are shown below.

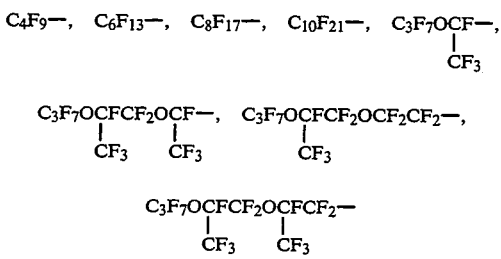

In formula (7), letters a, b and c are integers in the range: $a = 2$ to 3,000, $b = 1$ to 1,000, and $c = 0$ to 50.

Examples of the acid and alkali used as the polymerization catalyst include alkali hydroxides such as lithium hydroxide, sodium hydroxide, and potassium hydroxide, alkali siliconates such as lithium siliconate, sodium siliconate, and potassium siliconate, quaternary salt hydroxides such as tetrabutylphosphine hydroxide and tetramethylammonium hydroxide, sulfuric acid, sulfonic acids such as trifluoromethane sulfonic acid, and five coordinate silicon compound of the following structural formula.

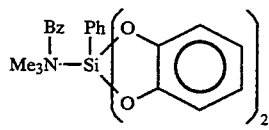

The fluorinated organopolysiloxane containing a monovalent hydrocarbon group having an aliphatic unsaturated bond of formula (7) which is prepared by a polymerization method as mentioned above preferably has a viscosity of 100 to 50,000 centistokes.

Component (B) is a cyclic fluorinated organosiloxane serving as a tackifier. It is of the following general formula (1).

In the formula, $R^1$ is a substituted or unsubstituted monovalent hydrocarbon group having 2 to 12 carbon atoms and having an aliphatic unsaturated bond, $R^2$, $R^3$ and $R^6$ are independently selected from substituted or unsubstituted monovalent hydrocarbon groups having 1 to 12 carbon atoms free of an aliphatic unsaturated bond, $R^4$ and $R^5$ are independently selected from substituted or unsubstituted divalent hydrocarbon groups having 1 to 12 carbon atoms free of an aliphatic unsaturated bond, Rf is a monovalent perfluoropolyether group or monovalent perfluoroalkyl group having 1 to 18, especially 1 to 18 carbon atoms, and letters ma and n are numbers satisfying $n+m=3$, $n \geq 1$, and $m \geq 1$.

Examples of the hydrocarbon group represented by $R^1$ include vinyl, allyl, butenyl and styryl groups. Examples of the hydrocarbon group represented by $R^2$, $R^3$ and $R^6$ include alkyl groups such as methyl, ethyl, isopropyl and butyl, cycloalkyl groups such as cyclohexyl and cyclopentyl, aryl groups such as phenyl, tolyl and xylyl, aralkyl groups such as benzyl and phenylethyl, halogenated hydrocarbon groups such as chloromethyl, chloropropyl, chlorocyclohexyl and 3,3,3-trifluoropropyl, and cyano hydrocarbon groups such as 2-cyanoethyl. Examples of the divalent hydrocarbon group represented by $R^4$ and $R^5$ include alkylene groups such as ethylene, propylene, and butylene, and arylene groups such as phenylene and tolylene.

Examples of Rf are shown below.

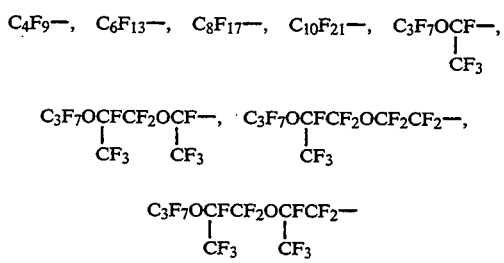

Among the fluorinated organosiloxanes of formula (1), those compatible with component (A) are preferred because uniformly cured products are expectable.

Component (A) or fluorinated organo-polysiloxane and component (B) or cyclic fluorinated organosiloxanes are preferably blended such that 0.01 to 30 parts, especially 0.05 to 15 parts by weight of component (B) is present per 100 parts by weight of component (A). On this bases, less than 0.01 part of component (B) would be too small to provide adhesion whereas more than 30 parts of component (B) would sometimes detract from heat resistance and compression set.

Component (C) is an organohydrogenpolysiloxane having at least two hydrogen atoms attached to a silicon atom in a molecule. It serves as a crosslinking agent. Exemplary compounds are given below.

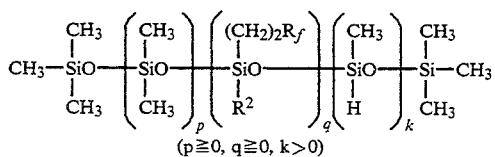

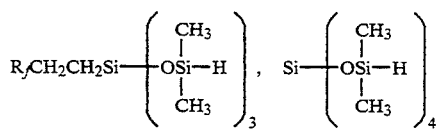

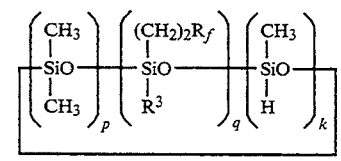

Copolymers consisting of $(CH_3)_2.HSiO_{\frac{1}{2}}$ and $SiO_2$ units.

In the formulae, $R^3$ and $Rf$ are as previously defined, and letters p, q, and k are numbers in the range $p \geq 0$, $q \geq 0$, and $k > 0$.

Component (C) or organohydrogenpolysiloxane is blended in the composition such that 0.5 to 5 mol, especially 0.5 to 3 mol of a hydrogen atom attached to a silicon atom (that is, $\equiv$SiH group) is available per mol of the aliphatic unsaturated group in the entire composition.

Component (D) is a platinum group metal compound serving as a curing catalyst. Examples include platinum black, chloroplatinic acid, complexes of chloroplatinic acid with alcohols, ethers, aldehydes, olefins (e.g., ethylene), vinylsilanes, and vinylsiloxanes, and platinum powder on supports such as alumina, silica and asbestos.

Preferably, component (D) or platinum group metal compound is added such that when calculated as metallic platinum, 1 to 500 ppm, especially 5 to 20 ppm of platinum is available based on the weight of component (A).

Components (A) to (D) are essential components while the composition of the invention contains optional components which may be selected from additives commonly used in conventional silicone rubbers. The optional components include reinforcing fillers such as fumed silica, precipitated silica, carbon powder, titanium dioxide, aluminum oxide, ground quartz, talc, sericite, and bentonite, fibrous fillers such as asbestos, glass fibers and organic fibers, dispersants such as diphenyl-silane diol, hydroxyl-terminated dimethylpolysiloxane having a low degree of polymerization, and hexamethyldisilazane, heat resistance enhancers such as ferrous oxide, ferric oxide, cerium oxide, and iron octylate, and pigments. These additives may be used in conventional amounts insofar as the objects of the invention are not impaired.

The composition of the invention is obtained by blending predetermined amounts of the essential components (A) to (D) and optional components and uniformly kneading the mixture by any desired mixer.

The organopolysiloxane composition of the invention is cured by heating at a temperature of 100° to 200° C. for about 30 seconds to about one hour under atmospheric or increased pressure, obtaining a rubbery elastomer having excellent properties. If the composition is cured on a support, it firmly adheres to the support.

There has been described a fluorinated organopolysiloxane composition having excellent properties inherent to fluorinated silicone rubber, curing into products having good adhesion to various materials, and suitable as packing sealing and coating materials in electric and electronic fields.

EXAMPLE

Examples of the present invention are given below by way of illustration and not by way of limitation. All parts are by weight.

EXAMPLE 1 & COMPARATIVE EXAMPLE 1

A 1-liter separable flask equipped with a stirrer was charged with 1,000 grams (1.458 mol) of a cyclotrisiloxane of formula (8), 11.9 grams (0.0146 mol) of lithium silanolate of formula (9), and 1.0 grams of tetraglyme. In a nitrogen atmosphere, reaction was effected at 100° C. for 5 hours.

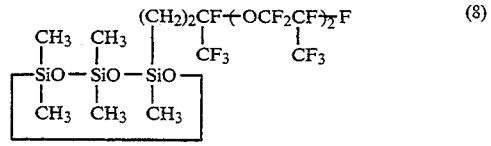

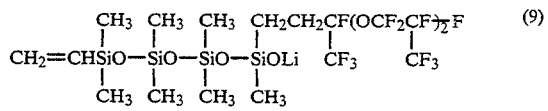

The reaction mixture was cooled down. To the reaction mixture at 50° C. were added 2.6 grams (0.0219 mol) of a compound of formula (10) and 6.1 grams (0.0328 mol) of a compound of formula (11). The reaction mixture was agitated for two hours for neutralization and terminal silylation.

The reaction mixture was filtered and stripped, obtaining 938 grams of a polymer of formula (12) having a viscosity of 3,570 centistokes.

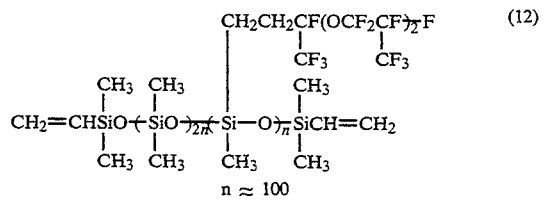

In a kneader, 100 parts of the polymer of formula (12) and 15 parts of a fumed silica having a specific surface area of 300 m²/g were kneaded at 150° C. for three hours.

To the mixture were added 1.8 grams of a compound of formula (13), 0.2 grams of carbon black, 0.1 gram of a toluene solution of a [(CH$_2$=CHSi(CH$_3$)$_2$—O]-modified chloroplatinic acid catalyst, 0.4 grams of a 50% toluene solution of ethynylcyclohexanol, and 1.0 grams of a compound of formula (14) as a tackifier. They were mixed into a composition I.

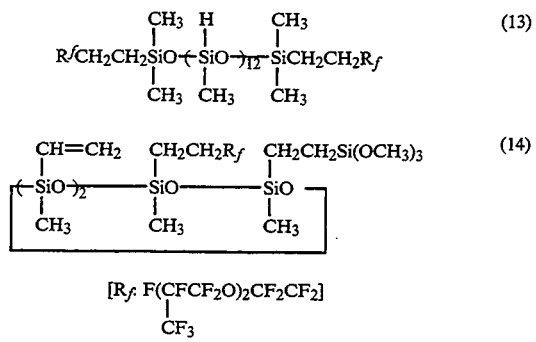

Composition II was prepared by the same procedure as composition I except that the tackifier was omitted.

Each of compositions I and II was pressed at a temperature of 150° C. and a pressure of 100 kg/cm$^2$ for 15 minutes into a sheet of 2 mm thick. The sheet was heat treated at 150° C. for one hour and then examined for rubber physical properties according to JIS K-6301. The results are shown in Table 1.

A shearing test was carried out by fabricating a test sample as shown in FIG. 1. A pair of parallel plates 1 were joined together at one end through a sealing layer 2. An auxiliary plate was rested on the upper plate 1 and supported at an overhanging end by a spacer 3 on the lower plate 1 and at an overlapping end by another spacer via the upper plate 1. A weight 4 rested on the auxiliary plate above the sealing layer 2. In this condition, the plates were pulled in opposite directions until the joint was broken. The plates 1 was made of glass, aluminum, iron or epoxy resin while the sealing layer 2 made of cured composition I or II. In this way, the shearing adhesive force to glass, aluminum, iron and epoxy resin was measured. The results are shown in Table 2.

TABLE 1

| Composition | Example 1 I | Comparative Example 1 II |
|---|---|---|
| Hardness, JIS A | 27 | 25 |
| Elongation, % | 300 | 320 |
| Tensile strength, kgf/cm$^2$ | 33 | 31 |

TABLE 2

| Composition | Example 1 I | | Comparative Example 1 II | |
|---|---|---|---|---|
| Adherend | SAF | CF | SAF | CF |
| Glass | 19.0 | 100 | 8.2 | 10 |
| Aluminum | 16.5 | 100 | 7.2 | 0 |
| Iron | 20.5 | 100 | 6.5 | 0 |
| Epoxy resin | 18.3 | 100 | 9.0 | 0 |

SAF: shearing adhesive force in kgf/cm$^2$
CF: cohesive failure in %

As seen from Tables 1 and 2, the sheet of the composition within the scope of the invention has good rubber physical properties and is well adhesive to various supports.

The sheet of composition I was examined for swelling with various solvents (acetone, ethyl acetate, toluene, carbon tetrachloride and hexane). The percent volume and weight changes of the sheet were determined by immersing the sheet in a solvent at 20° C. for 72 hours, measuring the volume and weight of the swollen sheet, and dividing the volume and weight of the swollen sheet by those of the initial sheet. For comparison purposes, dimethylsilicone rubber KE951 and fluorosilicone rubber FE 251 (trifluoropropylmethylsiloxane rubber type), both available from Shin-Etsu Chemical Co., Ltd., were similarly examined for solvent swelling. The results are shown in Table 3.

TABLE 3

| Solvent | | Example 1 Composition I | Comparison KE951 | Comparison FE251 |
|---|---|---|---|---|
| Acetone | volume change (%) | 21 | 26 | 126 |
| | weight change (%) | 12 | 21 | 71 |
| Ethyl acetate | volume change (%) | 32 | 143 | 120 |
| | weight change (%) | 23 | 134 | 76 |
| Toluene | volume change (%) | 30 | 270 | 18 |
| | weight change (%) | 18 | 217 | 11 |
| CCl$_4$ | volume change (%) | 30 | 346 | 17 |
| | weight change (%) | 33 | 416 | 16 |
| Hexane | volume change (%) | 19 | 186 | 10 |
| | weight change (%) | 9 | 119 | 2 |

As seen from Table 3, the sheet of the composition within the scope of the invention is well resistant against solvent swelling.

EXAMPLE 2 & COMPARATIVE EXAMPLE 2

A 1-liter separable flask equipped with a stirrer was charged with 1,000 grams (1.529 mol) of a cyclotrisiloxane of formula (15), 7.5 grams (0.0153 mol) of lithium silanolate of average molecular formula (16), and 1.0 grams of tetraglyme. In a nitrogen atmosphere, reaction was effected at 100° C. for 5 hours.

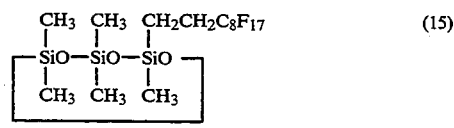

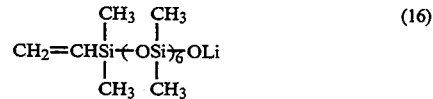

The reaction mixture was cooled down. To the reaction mixture at 50° C. were added 2.8 grams (0.023 mol) of a compound of formula (17) and 6.4 grams (0.035 mol) of a compound of formula (18). The reaction mixture was agitated for two hours for neutralization and terminal silylation.

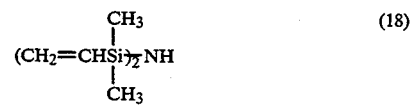

The reaction mixture was filtered and stripped, obtaining 911 grams of a polymer of formula (19) having a viscosity of 10,510 centistokes.

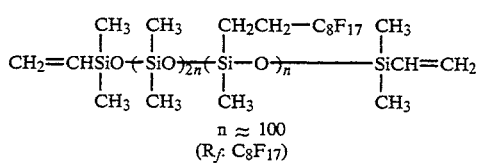

$$n \approx 100$$
$$(R_f: C_8F_{17})$$

In a kneader, 100 parts of the polymer of formula (19) and 15 parts of a fumed silica having a specific surface area of 300 m²/g were kneaded at 150° C. for three hours.

To the mixture were added 0.58 grams of a compound of formula (20), 0.2 grams of carbon black, 0.2 gram of an alcohol solution of a chloroplatinic acid (platinum concentration 0.5%), 0.4 grams of a 50% toluene solution of ethynylcyclohexanol, and 1.0 grams of a compound of formula (21) as a tackifier. They were mixed into a composition III.

$$(CH_3)_3SiO + SiO\!\!\!\!/_{\!\!\overline{\!8\!}}\, Si(CH_3)_3 \quad (20)$$
$$\underset{CH_3}{\big|}$$

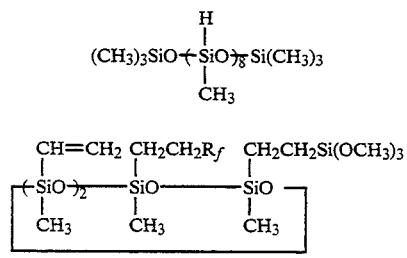

Composition IV was prepared by the same procedure as composition III except that the tackifier was omitted.

As in Example 1, a sheet was press cured and a shearing test assembly was fabricated from each of composition III and IV. The measurements of physical properties are shown in Tables 4 and 5. The sheets were also examined for solvent swelling, with the results shown in Table 6.

TABLE 4

| Composition | Example 2 III | Comparative Example 2 IV |
|---|---|---|
| Hardness, JIS A | 30 | 29 |
| Elongation, % | 350 | 370 |
| Tensile strength, kgf/cm² | 38 | 39 |

TABLE 5

| Composition | Example 2 III | | Comparative Example 2 IV | |
|---|---|---|---|---|
| Adherend | SAF | CF | SAF | CF |
| Glass | 17.2 | 100 | 7.3 | 0 |
| Aluminum | 16.9 | 100 | 6.2 | 0 |
| Iron | 18.3 | 100 | 5.9 | 0 |
| Epoxy resin | 17.5 | 100 | 9.2 | 10 |

SAF: shearing adhesive force in kgf/cm²
CF: cohesive failure in %

TABLE 6

| Solvent | | Example 2 Composition III |
|---|---|---|
| Acetone | volume change (%) | 16 |
| | weight change (%) | 8 |

TABLE 6-continued

| Solvent | | Example 2 Composition III |
|---|---|---|
| Ethyl acetate | volume change (%) | 25 |
| | weight change (%) | 14 |
| Toluene | volume change (%) | 23 |
| | weight change (%) | 12 |
| CCl₄ | volume change (%) | 25 |
| | weight change (%) | 23 |
| Hexane | volume change (%) | 16 |
| | weight change (%) | 8 |

As seen from Tables 4, 5, and 6, the composition within the scope of the invention has good rubber physical properties, good adhesion to various supports, and resistance against solvent swelling.

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane composition comprising
   (A) a linear fluorinated organopolysiloxane having in a molecule at least two monovalent hydrocarbon groups each having an aliphatic unsaturated bond attached to a silicon atom, and further having at least one group selected from monovalent perfluoroalkyl or monovalent perfluoropolyether groups attached to a silicon atom,
   (B) a cyclic fluorinated organosiloxane of the general formula (1):

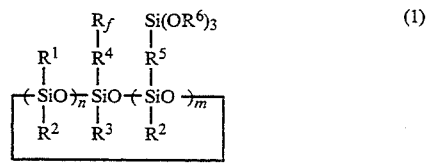

wherein $R^1$ is a substituted or unsubstituted monovalent hydrocarbon group having an aliphatic unsaturated bond, $R^2$, $R^3$ and $R^6$ are independently selected from substituted or unsubstituted monovalent hydrocarbon groups free of an aliphatic unsaturated bond, $R^4$ and $R^5$ are independently selected from substituted or unsubstituted divalent hydrocarbon groups free of an aliphatic unsaturated bond, $R_f$ is a monovalent perfluoropolyether group or monovalent perfluoroalkyl group, and letters m and n are numbers satisfying n+m=3, n≧1, and m≧1, as a tackifier,
   (C) an organohydrogenpolysiloxane having at least two hydrogen atoms attached to a silicon atom in a molecule, and
   (D) a platinum group metal catalyst.

2. An organopolysiloxane composition according to claim 1 wherein fluorinated organopolysiloxane (A) is a polymer of the general formula (7):

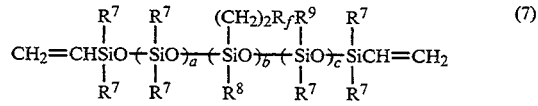

wherein $R^7$ and $R^8$ are independently selected from substituted or unsubstituted monovalent hydrocarbon groups free of an aliphatic unsaturated bond, $R^9$ is a monovalent hydrocarbon group having an aliphatic unsaturated bond, Rf is a monovalent perfluoropolyether group or monovalent perfluoroalkyl group, letters a, b and c are integers in the range: a=2 to 3,000, b=1 to 1,000, and c=0 to 50.

3. An organopolysiloxane composition according to claim 1 which contains 100 parts by weight of component (A), 0.01 to 30 parts by weight of component (B), component (C) in an amount to provide 0.5 to 5 mol of SiH group per mol of the aliphatic unsaturated group in the entire composition and 1 to 500 ppm calculated as platinum of component (D) based on the weight of component (A).

4. The organopolysiloxane composition according to claim 2, wherein $R^7$ and $R^8$ of the fluorinated organopolysiloxane (A) of formula (7) are independently selected from the substituted or unsubstituted monovalent hydrocarbon groups having 1 to 12 carbon atoms free of an aliphatic unsaturated bond.

5. The organopolysiloxane composition according to claim 2, wherein $R^9$ of the fluorinated organopolysiloxane (A) of formula (7) is a monovalent hydrocarbon group having 2 to 12 carbon atoms and an aliphatic unsaturated bond.

6. The organopolysiloxane composition according to claim 2, wherein $R_f$ of the fluorinated organopolysiloxane (A) of formula (7) is a monovalent perfluoropolyether group or monovalent perfluoroalkyl group having 1 to 18 carbon atoms.

7. The organopolysiloxane composition according to claim 2, wherein $R_f$ of the fluorinated organopolysiloxane (A) of formula (7) is a monovalent perfluoropolyether group or monovalent perfluoroalkyl group having 1 to 12 carbon atoms.

8. The organopolysiloxane composition according to claim 4, wherein the hydrocarbon group represented by each of $R^7$ and $R^8$ is selected from the group consisting of alkyl, cycloalkyl, aryl, aralkyl, halogenated hydrocarbon group and cyano hydrocarbon group.

9. The organopolysiloxane composition according to claim 5, wherein the hydrocarbon group represented by $R^9$ is selected from the group consisting of vinyl, allyl and ethynyl.

10. The organopolysiloxane composition according to claim 6, wherein $R_f$ is selected from the group consisting of

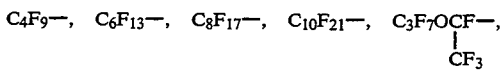

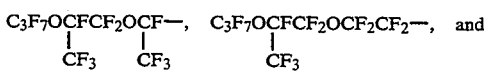

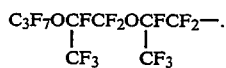

11. The organopolysiloxane composition according to claim 2, wherein the fluorinated organopolysiloxane (A) of formula (7) has a viscosity of 100 to 50,000 centistokes.

12. The organopolysiloxane composition according to claim 1, wherein $R^1$ of the cyclic fluorinated organosiloxane of formula (1) is a substituted or unsubstituted monovalent hydrocarbon group having 2 to 12 carbon atoms and having an aliphatic unsaturated bond.

13. The organopolysiloxane composition according to claim 1, wherein $R^2$, $R^3$ and $R^6$ of the cyclic fluorinated organosiloxane of formula (1) are independently selected from substituted or unsubstituted monovalent hydrocarbon groups having 1 to 12 carbon atoms free of an aliphatic unsaturated bond.

14. The organopolysiloxane composition according to claim 1, wherein $R^4$ and $R^5$ of the cyclic fluorinated organosiloxane of formula (1) are independently selected substituted or unsubstituted divalent hydrocarbon groups having 1 to 12 carbon atoms free of an aliphatic unsaturated bond.

15. The organopolysiloxane composition according to claim 1, wherein $R_f$ of the cyclic fluorinated organosiloxane of formula (1) is a monovalent perfluoropolyether group or monovalent perfluoroalkyl group having 1 to 18 carbon atoms.

16. The organopolysiloxane composition according to claim 12, wherein the hydrocarbon group represented by $R^1$ is selected from the group consisting of vinyl, allyl, butenyl and styryl.

17. The organopolysiloxane composition according to claim 13, wherein the hydrocarbon group represented by $R^2$, $R^3$ and $R^6$ is selected from the group consisting of alkyl, cycloalkyl, aryl, aralkyl, halogenated hydrocarbon group and cyano hydrocarbon group.

18. The organopolysiloxane composition according to claim 14, wherein the divalent hydrocarbon group represented by $R^4$ and $R^5$ is selected from the group consisting of alkylene and arylene.

19. The organopolysiloxane composition according to claim 15, wherein $R_f$ is selected from the group consisting of

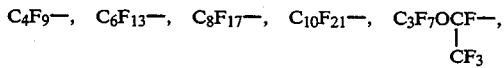

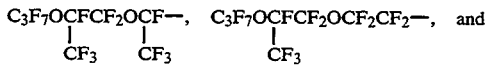

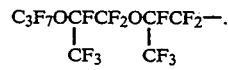

20. The organopolysiloxane composition according to claim 3, which contains 0.05 to 15 parts by weight of component (B) per 100 parts by weight of component (A).

21. The organopolysiloxane composition according to claim 1, wherein the organohydrogenpolysiloxane (C) is selected from the group consisting of

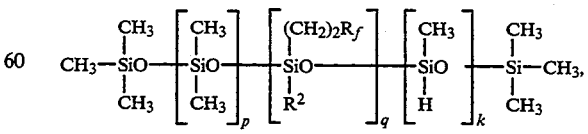

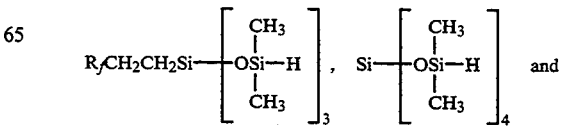

-continued

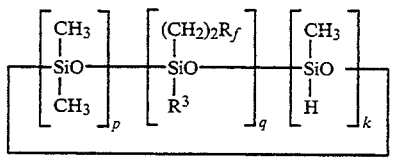

wherein p≧0, q≧0 and k>0, R³ is a substituted or unsubstituted monovalent hydrocarbon group free of an aliphatic unsaturated bond, and R_f is a monovalent perfluoropolyether group or monovalent perfluoroalkyl group.

22. The organopolysiloxane composition according to claim 3, which contains component (C) in an amount to provide 0.5 to 3 mol of SiH group per mol of the aliphatic unsaturated group in the entire composition.

23. The organopolysiloxane composition according to claim 1, wherein the platinum group metal catalyst is selected from the group consisting of platinum black, chloroplatinic aid, complexes of chloroplatinic acid with alcohols, ethers, aldehydes, olefins, vinylsilanes and vinylsiloxanes, and platinum powder on alumina, silica or asbestos support.

24. The organopolysiloxane composition according to claim 3, which contains 5 to 20 ppm calculated as platinum of component (D) based on the weight of component (A).

* * * * *